United States Patent [19]

O'Brien, deceased

[11] 4,011,986
[45] Mar. 15, 1977

[54] INTERPOSER MECHANISM

[75] Inventor: Richard C. O'Brien, deceased, late of Dayton, Ohio, by Elva R. O'Brien, executrix

[73] Assignee: O.K. Partnership, Cincinnati, Ohio

[22] Filed: Apr. 14, 1976

[21] Appl. No.: 676,758

[52] U.S. Cl. .............................. 234/47; 234/115; 209/110
[51] Int. Cl.² ......................................... G06K 1/05
[58] Field of Search ............ 234/47, 115, 114, 116; 235/61.6 J; 209/110, 109

[56] References Cited
UNITED STATES PATENTS

3,628,723  12/1971  Ehrat ................... 234/115
3,655,126  4/1972  Digilio ................. 234/115

Primary Examiner—Frank T. Yost
Attorney, Agent, or Firm—Wood, Herron & Evans

[57] ABSTRACT

A selectively operable interposer mechanism for positioning bars, or the like, in a card selector or coder. Each interposer includes an interposer blade of magnetically responsive material disposed in a longitudinal slot of a nonmagnetic platen. A bar is disposed in each slot and is adapted to be pushed by the interposer blade acting through a rolling disc disposed in the slot between the blade and bar. Disposed directly above each interposer blade is a solenoid coil effective, when engaged, to pivot the associated interposer blade into contact with a permanent magnet which captures the interposer blade. A pusher assembly including the permanent magnet is operative to displace each captured interposer blade and the associated bar longitudinally along their respective slots from a rest position to a displaced position. After a coding or sorting operation, the pusher assembly returns the bars and interposers to their initial rest position. In this position, the magnet is disengaged from the interposer blades; and since the solenoids are disengaged, the blades drop to their unactuated position within the slots.

20 Claims, 10 Drawing Figures

INTERPOSER MECHANISM

BACKGROUND OF THE INVENTION

This invention relates generally to apparatus handling edge-coded documents, such as cards, microfiche jackets, and the like. The present invention is adapted for use with both equipment for notching the edges of documents to code them and with equipment for selecting documents bearing a selected code from a group of randomly-stored documents bearing a large number of different codes. The invention is more particularly directed to an improved interposer mechanism for positioning elongated bars which are utilized in such apparatus to establish a code pattern for selecting cards or to actuate punches for notching a code pattern along the edge of a card.

The interposer of this invention may be employed advantageously with many different types of sorting or coding apparatus. One general type of apparatus with which it is particularly adapted to be utilized is disclosed in Robert D. Parry Reissue U.S. Pat. No. Re. 23,762 for "Article Selection System." In order to provide a better appreciation of the mode of operation and advantages of the present interposer, it will be described in relation to apparatus generally of the type disclosed in the above identified Parry patent. The present interposer construction is also especially adapted for use in a combined selector and card puncher of the type disclosed in the copending application of Richard C. O'Brien entitled "Combined Article Selector and Coder", Ser. No. 596,915, filed July 17, 1975.

In general, a document selection or retrieval system of the type disclosed in the Parry patent is adapted to select mechanically from a group of randomly-stored, edge-notched cards those cards bearing a predetermined coding. In the Parry-type of apparatus, a group of cards are supported parallel to one another on their notched edges. The support surface for the cards comprises a platen having a plurality of elongated slots corresponding in number to the possible notch sites of the cards. These slots extend perpendicular to the edges of the cards. Each slot houses a coding bar which can be positioned in a retracted position below the level of the platen where it is completely disengaged from the cards, or in a raised position in which it extends a fraction of an inch above the platen. In accordance with the disclosure of the Parry patent, the cards include a plurality of serrations, or teeth, along their lower edges. Selected teeth are cut to form the notches corresponding to the desired code.

In order to select the card or cards bearing a predetermined code, bars in the positions corresponding to the code are elevated in response to electrical input signals generated when an operator pushes buttons corresponding to the selected code. These bars enter the spaces in the cards between adjacent teeth.

The selector described above also includes a rather complex mechanism for moving selected coding bars from their retracted position to a raised position in response to electrical input signals from the keyboard. This mechanism includes a plurality of solenoids mounted on a movable carriage. Each solenoid operates a linkage effective to engage and shift the adjacent code bar when the solenoid is energized. After one set of blades has been set, the carriage is advanced to bring the solenoid-actuated linkages adjacent to a new group of code bars. Selected solenoids are energized to set the new bars. Thereafter, the carriage is again advanced to bring the linkages adjacent to a new set of bars and the desired solenoids energized. This is repeated until all of the chosen bars are set. Once all of the selected coding bars have been raised, a magnetic member in contact with magnetically-responsive chips on the upright edges of the ends is shifted away from the card deck to slide the selected card or cards transversely across the platen.

While the mechanism described in the above-identified patent has proved to be reliable for separating selected edgenotched cards from a plurality of such cards, it is subject to certain drawbacks. In the first place, the code bar setting mechanism is costly because of its mechanical complexity and the relatively close tolerances required. In addition to the cost, the movable carriage and its escapement-type shifting mechanism require maintenance to ensure reliable operation. Furthermore, the overall mechanism is relatively noisy in operation.

In view of the foregoing shortcomings associated with prior art code bar setting mechanisms, it is a primary objective of this invention to provide a novel interposer mechanism for positioning code bars, or the like, in a document selection system which is of extremely simple construction and requires relatively low tolerance parts.

It is a further objective of this invention to provide an interposer mechanism for positioning code bars, or the like, which is less expensive to produce and is more trouble-free in operation.

It is another objective of the invention to provide an interposer for positioning code bars, or the like, in a document retrieval apparatus which is compact in size and quiet in operation.

These and other objects and advantages of this invention will become more readily apparent from a consideration of the following detailed description of a preferred embodiment of the invention:

DETAILED DESCRIPTION

Figure 1:
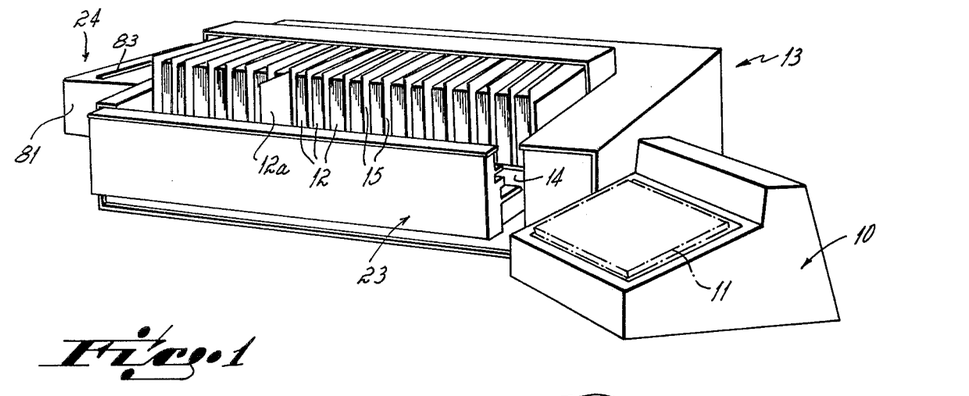
FIG. 1 is a perspective view of one exemplary form of article selector and coder embodying the present interposer.

The overall construction of one form of article selection system with which the present interposer can be employed is shown in FIG. 1. The system there shown is of the type generally described in Robert D. Parry U.S. Pat. No. Re. 23,762, and includes a coder mechanism shown in the copending application of Richard C. O'Brien for "Combined Article Selector And Coder", Ser. No. 596,915, filed July 17, 1975. It is to be understood that the present interposer can be utilized not only with a combined selector-coder, but also with a selector not incorporating a coder and with a coder unit having no selection capability.

As shown in FIG. 1, the article selection system includes a keyboard control console 10 which is utilized by the system operator to enter, via the console keys 11, a code which corresponds to the identity of the edge-notched card or cards being sought from the plurality of such cards stored in the system. In the specific embodiment shown, the keys 11 can also be utilized to establish a code to be encoded on a card by cutting selective teeth therefrom.

Figure 2:
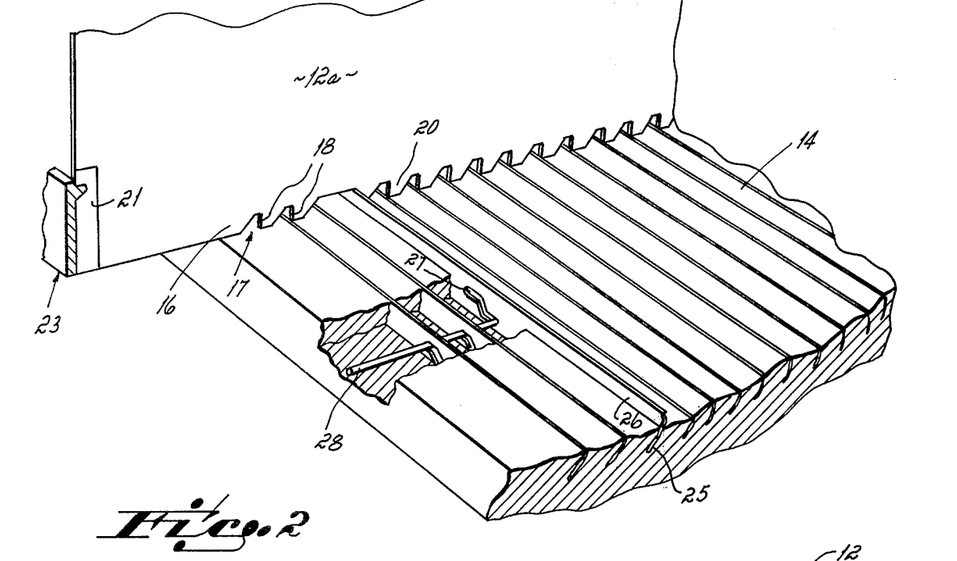
FIG. 2 is a perspective view, partially broken away, of the article selector platen.

A stack of cards 12 is positioned in the card selector mechanism shown generally at 13. Each such card 12 is formed of a card stock substantially like that used for data processing cards. Each card is generally rectangular and includes a coded or sorting edge 16. When used in the apparatus shown in FIG. 1, the cards are positioned with the code notches disposed along the lower edges of the cards which rest on the upper surface of a platen 14 (FIG. 2). A plurality of vertically disposed card separators 15 are located along the length of the platen 18 to form supports for maintaining the cards 12 in a vertical position with their notched edges extending parallel to one another.

Figure 3:
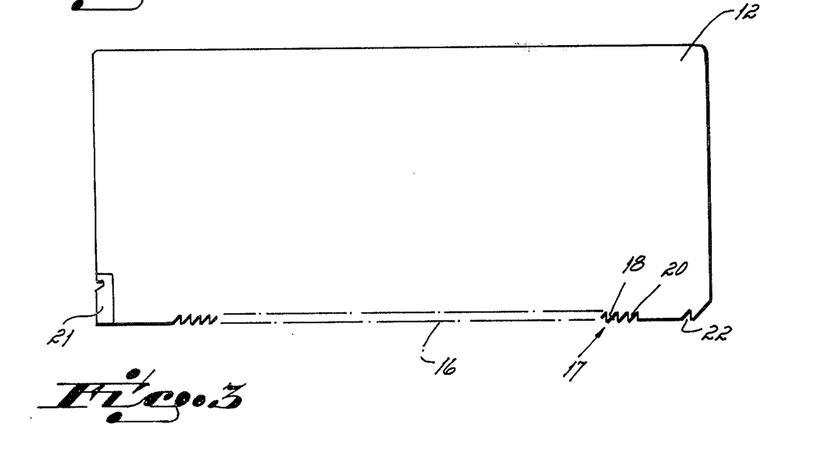
FIG. 3 is an elevational view of one form of card for use in the selector apparatus of FIG. 1.

As best seen in FIG. 3, the sorting edge 16 of each card includes a plurality of code sites 17. Each code site includes a registration notch 18 and a selectively removable or notchable tooth 20. The cards also include a ferromagnetic chip 21 and a locking notch 22 used in the selection operation as described in the above referred-to Parry patent. Cards 12 are coded by removing one or more teeth 20 in accordance with a predetermined coding scheme.

The card selecting mechanism 13 includes a carrier 23 which is horizontally movable and operates in cooperation with other components of the selection mechanism to remove a selected card or cards, such as card 12a, from the stack of card which are resting on the platen 14.

The specific apparatus disclosed as being exemplary of the utility of the present interposer includes, in addition to selector 13, a coder mechanism 24 which is effective to code cards by removing selected teeth. However, it is to be understood that the details of the coder 24 constitute no part of the present invention.

Figures 4, 5:
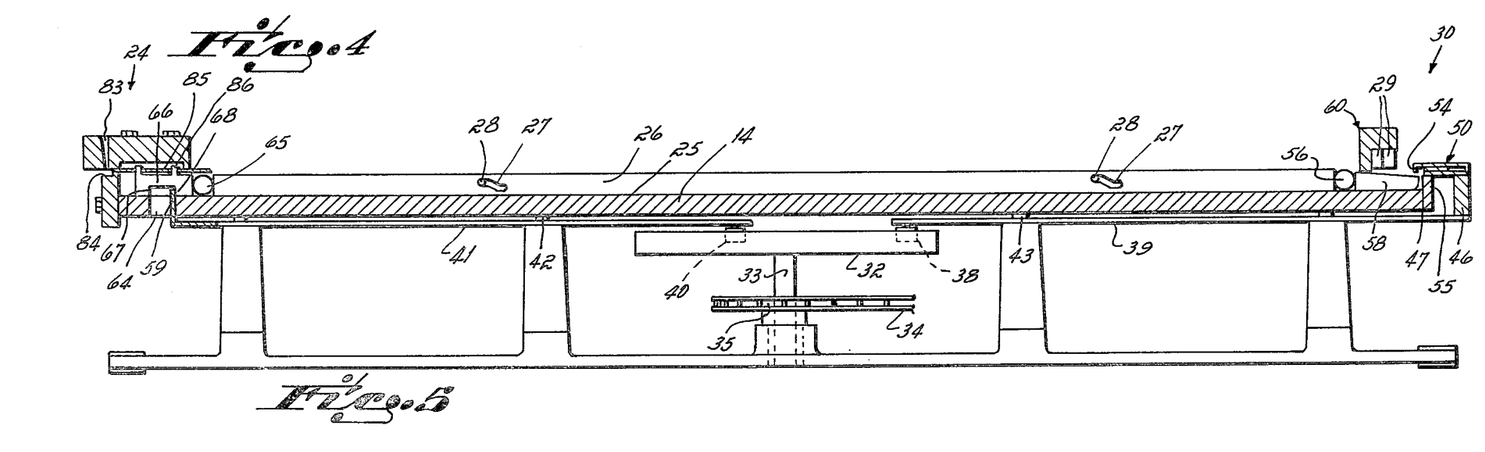
FIG. 4 is a top plan view, partially broken away, of tthe article selector platen and interposer.
FIG. 5 is a vertical cross-sectional view taken along line 5—5 of FIG. 4.

The overall relationship of the card selector, coder and interposer is best shown in FIGS. 4 and 5. As there shown, the card-supporting platen 14 is a flat plate of generally rectangular configuration. The platen is provided with a plurality of parallel slots 25 disposed in a direction transverse to the sorting edges 16 of the cards 12. The slots 25 correspond in number and position to the registration notches 18 on the cards, there being one additional slot corresponding to locking notch 22 on the cards. When the cards 12 are properly positioned on the platen 14 for sorting, the slots 25 are disposed beneath the corresponding registration notches 18 and the locking notch 22.

A code bar, or sorting bar, 26 is slidably disposed in each of the slots 25 opposite a registration notch 18 of a stored card 12. A similarly configured locking bar (not shown) is disposed in the slot located opposite locking notch 22.

The code bars are adapted to be positioned in either one or two vertical positions, i.e., an upper position and a lower position. In the upper position the code bars extend above the upper surface of the platen by an amount equal to, or slightly less than, the depth of the registration notches 18. In the lower position, the upper edges of the code bars are preferably flush with, or slightly below, the upper surface of the card support platen. The code bars are shifted between their upper and lower positions by a two-component movement, i.e., the bars are shifted in a horizontal direction (to the left in FIG. 5) and are then cammed upwardly into their raised position. The bars are lowered by shifting movement in the opposite horizontal direction (to the right in FIG. 5) which results in the bars being cammed downwardly. As best seen in FIG. 2, the camming movements are due to the engagement of the arcuate slots 27 in bars 26 with stationary pins 28 which extend transversely of the bars.

Control over the specific code bars to be elevated during a particular operation is effected from the keys 11 of console 10. These keys control the solenoids 29 forming part of the interposer mechanism indicated generally at 30.

As shown in FIGS. 4 and 5, the mechanism for actuating the sorting bars 26 through interposer 30 includes a drive plate 32 mounted beneath platen 14. The drive plate is mounted upon a vertical shaft 33 which is interconnected through a suitable means, such as chain 34 and sprocket 35, to a motor (not shown) controlled from console 10. Shaft 33 is effective to rotate plate 32 one complete revolution in a counterclockwise direction during each operation cycle of the device.

The upper surface of drive plate 32 is provided with two cam slots 36 and 37. Slot 36 has located therein a follower roller 38 mounted upon actuator arm 39, while slot 37 receives roller 40 mounted upon reset arm 41. Arms 39 and 41 are constrained to reciprocating linear movement by means of pins 42 and 43 received within elongated guide slots 44 and 45 formed in each of the arms.

Actuator arm 39 carries at its outer end a bar 46 which extends from front to rear parallel to the outer edge 47 of the platen. This bar supports a magnetic platen assembly 50 forming one cooperative part of the interposer mechanism. The platen assembly includes parallel spaced, magnetically susceptible plates 51 and 52 having mounted therebetween a permanent magnet 53. The upper plate extends outwardly beyond the magnet 53 and lower plate 52 and includes a downwardly extending arm 54 constituting a rest pole. The forward edge 48 of lower plate 52 constitutes a pusher pole. This magnetic platen is adapted to be shifted between a retracted and advanced position (i.e., from right to left in FIGS. 4–9) by movement of actuator arm 39. As the magnetic platen is advanced, plate 52 passes above a stationary stop plate 55 mounted on the edge of platen 14 and enclosing the ends of each of the slots 25.

It is to be understood that each of the slots 25, sorting bars 26 and the disc and blade components of the interposer mechanism described below associated with each slot are identical with those shown in FIGS. 5-9. More particularly, the interposer end of each slot receives a disc 56 which is free to roll in the slot and is in engagement with the end of code bar 26. The disc 56 is restrained within the slot by an overhanging lip 57 formed on the end of the sorting bar 26. An interposer blade 58 is disposed within the slot on the side of disc 56 remote from the code bar. The interposer blade is of generally trapezoidal configuration with its upper wall sloping downwardly so that the widest portion of the blade is adjacent roller 56 and the narrowest portion of the blade is outermost.

Figure 10:
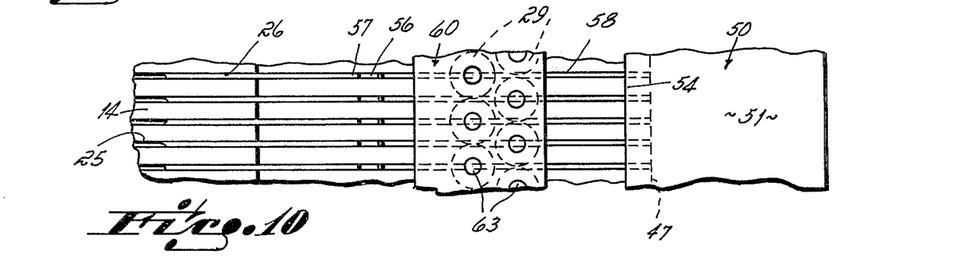
FIG. 10 is an enlarged top plan view of a portion of the platen and corresponding portion of the interposer assembly.

A solenoid 29 is mounted above each of the slots 25. As best seen in FIGS. 4-10, the solenoids are carried by an angle bracket 60 including an upstanding arm 61 and a horizontal arm 62 which overhangs the upper surface of the platen. The solenoids extend downwardly from horizontal arm 62 and are arranged in staggered relationship as shown in FIG. 10. Each solenoid coil surrounds a rod 63 which passes downwardly through an opening in horizontal arm 62, and through the windings of the solenoid and extends a slight distance below the lower end of the solenoid into close proximity with the upper edge of slot 25.

Figures 6, 7, 8, 9:
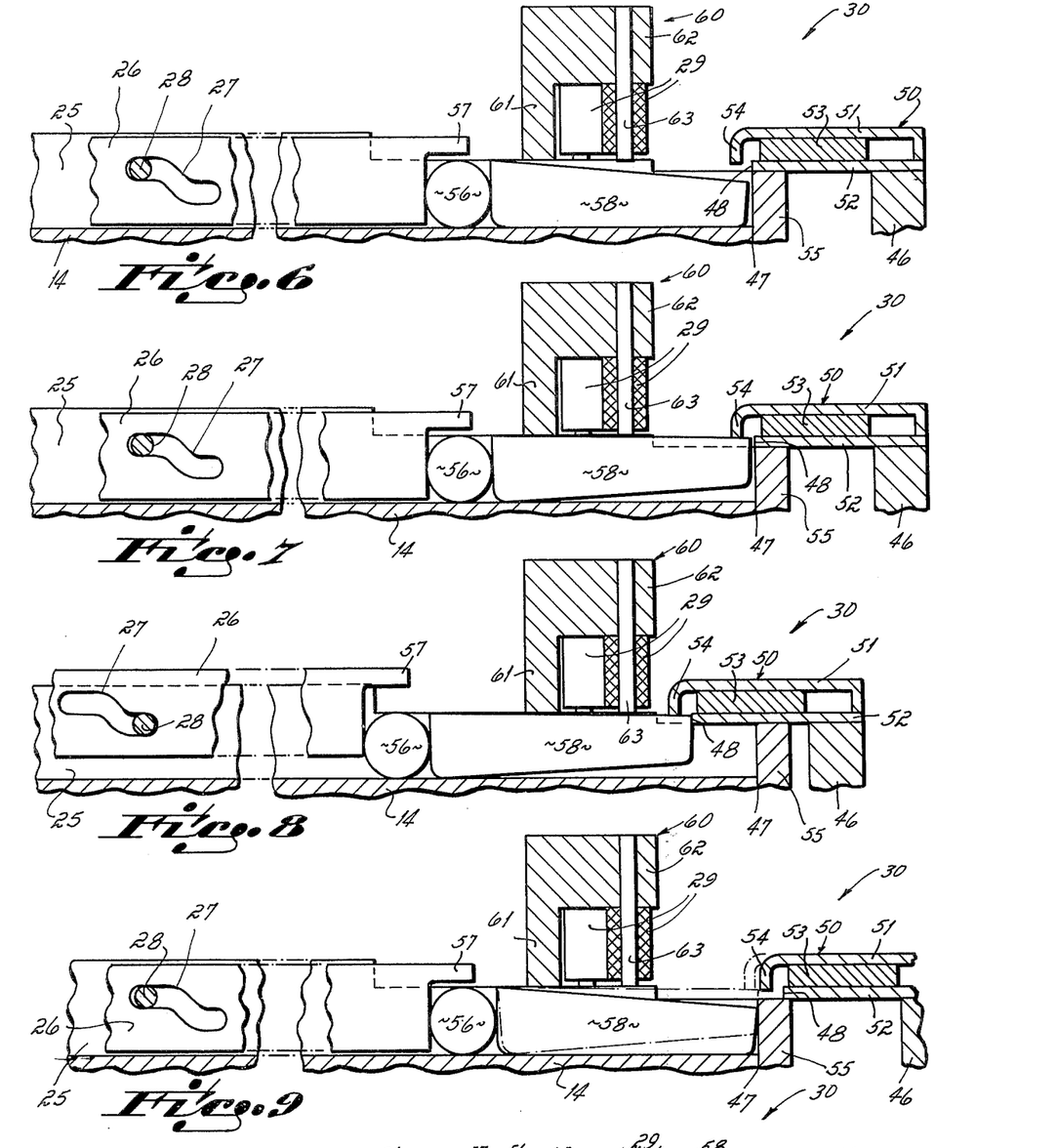
FIG. 6 is a framentary cross-sectional view taken along line 6—6 of FIG. 4 showing a code bar and interposer mechanism with the interposer mechanism being disposed in its "rest" or inactive position.
FIG. 7 is a view similar to FIG. 6 showing the interposer blade in a raised position.
FIG. 8 is a view similar to FIG. 4 showing the interposer blade in a raised position and the pusher assembly in an advanced position.
FIG. 9 is a view similar to FIG. 6 showing the pusher mechanism in a retracted position disengaged from the interposer blade.

The solenoids are positioned so that when the interposer blade 58 is in its retracted position as shown in FIGS. 5-7, and the solenoid is energized, the blade is caused to pivot in a counterclockwise direction upwardly into contact with the rest pole 54. When an interposer blade is brought into contact with the rest pole, it is retained in this position by the permanent magnet 53 even after the solenoid 29 is deenergized. The individual interposer solenoids are energized through an electrical circuit control by the code selection keys 11. Thus, when a code is entered on these keys, the solenoids associated with the corresponding code bars are momentarily energized to raise, or set, the adjacent interposer blades.

Thereafter, when the interposer blades corresponding to the desired codes have been "set", drive plate 32 is rotated to cause actuator bar 39 and the pusher assembly to be shifted to their advanced position, i.e., to the left in FIGS. 4-5 When this movement occurs, those interposer blades which have been set, or raised, are shifted to the left. These set blades push discs 56 to the left and thereby cause code bars 26 to be shifted to the left and to be cammed upwardly so that their edges project above the platen.

It will be appreciated that the interposer blades 58 associated with the code bars which are not to be actuated remain in their lowermost position and are not engaged by the pusher assembly since blades 52 and 53 pass over the top of these interposer blades.

The means for returning selector bars 26 to their lower, retracted position and resetting the interposer include a flange 59 formed on the end of upstanding reset arm 41. This flange extends upwardly through a slot 64 formed near the end of platen 14 remote from the interposer mechanism. It is to be understood that slot 64 extends from the front portion of the platen to the rear portion of the platen and intersects each of the slots 25.

It is further to be understood that if no coder mechanism is to be incorporated into the device, flange 59 can operate directly against the ends of each of the bars 26 (which would be extended in length) or could operate against the ends of these bars through a disc member, such as disc member 65. However, in the actual embodiment shown, including coder mechanism 24, flange 59 actually operates against the ends of bars 26 through the combination of actuator plates 66 and discs 65.

An actuator plate 66 is disposed within each slot 25. The actuator plate slide along the bottom wall of the slot in which it is located and includes a downwardly opening recess 67 adapted to receive the upper end of flange 53. At the start of an operating cycle, reset arm 41 is shifted to the left in FIGS. 1 and 5 so that the arm is disengaged from the right-hand shoulder 68 of the actuator members, freeing those members and their associated code bars for movement to the left. At the conclusion of an operating cycle, the restack arm is shifted to the right, forcing those actuator plates and code bars which have been advanced to be retracted back to their initial position, i.e., to the right in FIG. 5.

The details of operation of the present interposer in relation to the bar advancing and retracting mechanism can best be understood from a consideration of FIGS. 5-9. More particularly, at the start of a sorting cycle, the operator enters the desired code by punching the appropriate keys 11 on console 10. These keys are effective through control circuits of the type well-known in the art to energize the appropriate solenoids 29 associated with the code bars 26 corresponding to the code entered on the keys 11. Prior to the energization of solenoids 29, the selector bars and interposer mechanism components are in the position shown in FIG. 6. More particularly, the selector bars 26 are in their lower retracted, right-hand position. The solenoids 29 are deenergized so that the interposer blades 58 rest in the bottom of the slots closely adjacent to the right-hand end thereof. The rest pole 54 of the magnetic platen extends outwardly over the ends of the platen slots.

As each solenoid is energized, the associated actuator blade 58 is raised to the position shown in FIG. 7. Each blade that is raised is captured by the force of the permanent magnet and is held against rest pole 54. It is to be understood that through a suitable circuit, which constitutes no part of the present invention, the solenoids 29 are deenergized after the actuator blades have been set.

After the operator has inserted the entire code into the interposer, the operator pushes a suitable button to commence the sorting operation. In response to the depression of this button, a motor (not shown) is effective to rotate disc 32. As this disc rotates, reset bar 41 is shifted to the left as its roller 40 tracks in cam groove 37. Outward movement of the reset arm (to the left in FIGS. 4 and 5) disengages the flange 59 of reset arm 41 from shoulders 68 of the actuator plates 66, thereby freeing these plates for an advancing movement (to the left in FIGS. 4 and 5).

At the same time, roller 38 associated with arm 39 tracks in groove 36 causing the magnetic platen to be shifted to the left. As it moves to the left, as shown in FIG. 8, pusher pole 52 forces the raised interposer blades to the left along their grooves 25. These blades in turn force their associated discs 56 and blades 26 toward their advanced position, i.e., to the left in FIG. 3. As blades 26 move to the left, they are cammed upwardly by the interengagement of pins 28 and cam slots 27. These blades thus rise above the platen and enter the registry notches in cards 12 disposed above the blades.

At the same time, the ends of the code bars 26 shift discs 65 to the left. The forced exerted upon these discs is transmitted to actuator plates 66 which are similarly displaced to the left.

After the bars 31 have been set, the selector cycle is completed to remove the desired card or cards from the stack of cards 12. As the sorting-coding cycle progresses, disc 32 continues to rotate toward its original home position. As it rotates toward that position, actuator arm 39 is shifted toward its retracted position, i.e., to the right in FIGS. 5 and 9. This frees interposer blades 58, discs 56 and blades 26 for retracting movement to the right.

This continued rotary movement of drive disc 32 also causes reset arm 41 to be shifted toward its retracted position, i.e., to the right in FIG. 5. As the arm moves in this manner, its upstanding flange 59 engages shoulders 68 of the previously advanced actuator plates 66, forcing those plates toward their retracted position (to the right). As these plates are shifted, they force discs 65 to the right and these discs in turn act upon their associated code bars. As the code bars 26 are shifted to the right, they are also cammed downwardly by the interaction of pins 28 and slots 27.

Additionally, the opposite ends of code bars 26 force associated interposer discs 56 and interposer blades 58 to the right. As shown in FIG. 9, movement of the interposer blades in this direction is stopped by stop 55. However, the magnetic armature assembly including poles 52 and 54 is shifted even further to the right so that they are disengaged from the actuator interposer blades, permitting the interposer blades to drop to the position shown in FIG. 9. Thereafter, the magnetic platen is again advanced slightly to the left (as shown by dotted lines in FIG. 9) by inward movement of arm 45 to its initial position shown in FIG. 4.

At the conclusion of the cycle, the motor ratating disc 32 is deenergized, leaving the entire unit in condition for the next cycle as shown in FIGS. 5 and 6.

While the construction of coder apparatus 24 constitutes no part of the present invention, it will be described briefly to enable those skilled in the art to fully appreciate the manner in which the present interposer can be utilized to operate a coder. More particularly, as best shown in FIGS. 4 and 5, coder apparatus 24 is disposed on the opposite side of the platen 14 from the interposer mechanism 30, i.e., at the left end of platen 14 as viewed in FIGS. 4 and 5. The coder mechanism comprises a housing 81 (FIG. 1) and includes a substantially rectangular upper member 82 (FIG. 5) which is bolted or otherwise secured to the platen. Member 82 has a vertical sot 83 for receiving an edge-notched card which is to be coded. As best shown in FIG. 5, the vertical slot 83 includes converging walls which guide a card as it is inserted toothed-edge downwardly toward the narrow opening at the lower end of the slot. This narrow opening is only slightly wider than the thickness of a typical edge-notched card 12.

Disposed directly below the lower end of the slot is a ledge, or stop, 84 which supports from below any card 14 which is located in the slot 83. The ledge is operative to position the card 12 in precise vertical alignment with cutting blades 85 to permit removal of teeth from the card.

Cutting blades 85 are flat and are of generally rectangular configuration. The blades are mounted for horizontal movement toward and away from slot 83. Each cutting blade 85 is substantially wider than a slot 25 and is disposed above one such slot in sliding engagement with the upper surface of the platen 14. The blades are interconnected with the associated actuator plates 66 by means of two spaced tabs 86 which extend upwardly from each plate 66 and are received within mating apertures in a knife blade. Thus, when any actuator 66 is shifted along its slot, it will be operative to slide the correspondingly-engaged knife blade in a horizontal direction along the upper surface of the platen. In its retracted position, blade 85 is withdrawn from engagement with a card in slot 83. However, when it is advanced, blade 85 cuts through the card.

In operation, a user wishing to code a card inserts a toothed card of the type shown in FIG. 3 with the toothed coding edge extending downwardly into slot 83. The card is inserted until it comes to rest upon ledge 84. The slot 83 includes means engaging the side of the card for positioning the card with its teeth 18 in alignment with the proper corresponding knife blade 85. At the commencement of operation, the knife blades 85 are in their retracted positions as shown in FIG. 5. The code setting bars 26 are also in their retracted position as shown in FIG. 5.

In order to code the card, the operator enters the desired code by punching the keys 11 of the console. These keys are effective through control circuits of the type well-known in the art to energize solenoids 29 of the interposer and to energize the motor for rotating disc 32 as explained above. The interposer, magnetic assembly, reset arm and actuator arm function in precisely the same manner as when a card is selected. However, when the selector bars are shifted and a card is inserted in the coder, the actuator bars force their associated knives against the card to remove the corresponding teeth. More particularly, the ends of the coder bars 26 shift discs 65 to the left. The force exerted upon these discs is transmitted to actuator plates 66 which are similarly displaced to the left. As the actuator plates moves toward the left, their upstanding tangs force the overlying associated knife blades to the left, bringing these knife blades into engagement with the aligned teeth of the card located within slot 83. Each knife blade 85 which is so advanced progressively cuts the adjacent tooth 18 of the code the card with the code established on keys 11. As a result, the card placed in slot 83 is automatically encoded without any additional intervention by the operator.

After the teeth have been cut, the coding cycle is completed in response to continued rotation of disc 32 toward its original home position. As the disc rotates toward that position, actuator arm 39 is shifted toward its retracted position, i.e., to the right in FIG. 5. Reset arm 41 is also shifted toward its retracted position, i.e., to the right in FIG. 5. Movement of these arms causes the code bars 26 to be shifted to the right and the interposer reset to its initial condition shown in FIG. 6 as explained previously.

From a consideration of the preceding disclosure of the objects and advantages of the present invention and the detailed description of one preferred embodiment, those skilled in the art will readily comprehend various modifications to which the present invention is susceptible. Therefore, I desire to be limited solely by the scope of the following claims.

Having described my invention, I claim:

1. An interposer mechanism for selectively actuating one of a plurality of similar members, said members being slidably disposed in a plurality of parallel slots, said interposer mechanism comprising:
   a solenoid disposed above each of said slots and spaced longitudinally from the ends of said members;
   an interposer blade disposed in each of said slots for slidable movement therein;
   said interposer blade being disposed longitudinally beyond the member in said slot and being effective, when moved in the direction of said member, to cause said member to be shifted longitudinally within said slot;
   said interposer blade being positionable in an initial position beneath, and spaced from, said solenoid, whereby when said solenoid is energized, said interposer blade is elevated to a position in which a portion of said blade is disposed above said slot;
   a pusher assembly being positionable in an initial position above the ends of said slots;
   said pusher assembly including a magnet and associated pole member, said pole member being effective to engage any blade elevated in response to actuation of one of said solenoids, and being effective to capture said blade when said solenoid is deenergized;
   said pusher assembly being shiftable in a direction longitudinally of said slots and being effective to push the blades captured by said pole member longitudinally of said slots to thereby shift the corresponding members.

2. The interposer mechanism of claim 1 in which said interposer blades are of generally trapezoidal configuration.

3. The interposer mechanism of claim 2 in which said pusher assembly further comprises a pole effective to engage the ends of said captured blades.

4. The interposer mechanism of claim 1 in which a disc member is interposed in each slot between the ends of said members and said interposer blades.

5. The interposer mechanism of claim 4 in which said members include a flange overhanging said discs for retaining said discs in position.

6. The interposer mechanism of claim 1 further, comprising:
   a stationary member extending across the end of each of said slots to limit outward movement of said blades; and
   means for retracting said pusher assembly to a position beyond said stationary member to release said blades from said magnetic pole, permitting said blades to drop in their slots.

7. In a selector for selecting articles having a notched sorting edge from a plurality of such articles supported with their respective sorting edges aligned, the selector including:
   a platen for supporting said articles;
   a plurality of spaced parallel slots within said platen extending transversely of said sorting edges,
   a plurality of sorting bars, one of said sorting bars being disposed within each of said slots;
   the improvement comprising an interposer mechanism for selectively displacing said sorting bars in accordance with a preselected code, whereby said displaced bars are raised above said platen and enter registration notches in said articles, and articles not having said selected code are restrained, while articles having the selected code can be shifted relative thereto;
   a solenoid disposed above each of said slots and spaced longitudinally from the ends of said sorting bars;
   an interposer blade disposed in each of said slots for slidable movement therein;
   said interposer blade being disposed longitudinally beyond the sorting bar in said slot and being effective, when moved in the direction of said sorting bar, to cause said sorting bar to be shifted longitudinally within said slot;
   said interposer blade being positionable in an initial position beneath, and spaced from, said solenoid, whereby when said solenoid is energized, said interposer blade is elevated to position a portion of said blade above said slot;
   a pusher assembly being positionable in an initial position above the ends of said slots;
   said pusher assembly including a magnet and associated pole member, said pole member being effective to engage any blade elevated in response to actuation of one of said solenoids, and being effective to capture said blade when said solenoid is disengaged;
   said pusher assembly being shiftable in a direction longitudinally of said slots and being effective to push the blades captured by said pole member longitudinally of said slots to thereby shift the corresponding sorting bars.

8. The apparatus of claim 7 in which said interposer blades are of generally trapezoidal configuration.

9. The apparatus of claim 8 in which said pusher assembly further comprises a pole effective to engage the ends of said captured blades.

10. The appartus of claim 8 further comprising:
   a stationary member extending across the end of each of said slots to limit outward movement of said blades; and
   means for retracting said pusher assembly to a position beyond said stationary member to release said blades from said magnetic pole, permitting said blades to drop into their slots.

11. The apparatus of claim 7 in which a disc member is interposed between the ends of said sorting bars and said interposer blades.

12. The apparatus of claim 11 in which said sorting bars include a flange overhanging said discs for retaining said discs in position.

13. The apparatus of claim 7 further comprising:
   means for returning said sorting bars to a retracted position, said means comprising a reciprocally moving reset bar;
   drive means for shifting said reset bar, said reset bar being effective when shifted toward said interposer mechanism to exert a force on said sorting bars to force said sorting bars toward said interposer mechanism.

14. The apparatus of claim 13 in which said drive means includes a rotatable cam plate mounted beneath said platen, the cam plate having a track therein receiving a follower associated with said reset bar, an actuator bar interconnected with said with said reset bar, an actuator bar interconnected with said pusher assembly, said rotatable cam plate having a second track therein receiving a follower associated with said actuator bar.

15. In a coder for selectively notching articles having a sorting edge to encode the articles, said coder comprising:

article support means for supporting an article to be encoded;

a plurality of knife blades, each of said knife blades being movable transversely of said article to form a notch in said article;

a plurality of actuating members, one of said members being interconnected to each knife blade, said actuating members being slidably disposed in a plurality of parallel slots;

each of said knife blades being shifted transversely of said slot in response to movement of its associated actuating member;

the improvement comprising an interposer mechanism for selectively displacing said actuating members and knives in accordance with a preselected code, said interposer mechanism comprising:

a solenoid disposed above each of said slots and spaced longitudinally from the ends of said actuating members;

an interposer blade disposed in each of said slots for slidable movement therein;

said interposer blade being disposed longitudinally beyond the actuating member in said slot and being effective, when moved in the direction of said actuaing member, to cause said member to be shifted longitudinally within said slot;

said interposer blade being positionable in an initial position beneath, and spaced from, said solenoid, whereby when said solenoid is energized, said interposer blade is elevated to a position in which a portion of said blade is disposed above said slot;

a pusher assembly being positionable in an initial position above the ends of said slots;

said pusher assembly including a magnet and associated pole member, said pole member being effective to engage any blade elevated in response to actuation of one of said solenoids, and being effective to capture said blade when said solenoid is deenergized;

said pusher assembly being shiftable in a direction longitudinally of said slots and being effective to push the blades captured by said pole member longitudinally of said slots to thereby shift the corresponding members.

16. The apparatus of claim 15 further comprising:

a stationary member extending across the end of each of said slots to limit outward movement of said blades; and means for retracting said pusher assembly to a position beyond said stationary member to release said blades from said magnetic pole, permitting said blades to drop into their slots.

17. The apparatus of claim 15 further comprising:

means for returning said actuating members and knives to a retracted position, said means comprising a reciprocally moving reset bar;

drive means for shifting said reset bar, said reset bar being effective when shifted toward said interposer mechanism to exert a force on said actuating members to force said members toward said interposer mechanism.

18. The apparatus of claim 17 in which said drive means includes a rotatable cam plate mounted beneath said platen, the cam plate having a track therein receiving a follower associated with said reset bar, an actuator bar interconnected with said pusher assembly, said rotatable cam plate having a second track therein receiving a follower associated with said actuator bar.

19. The apparatus of claim 15 in which said interposer blades are of generally trapezoidal configuration.

20. The apparatus of claim 15 in which a disc member is interposed between the ends of said actuating members and said interposer blades.

* * * * *

UNITED STATES PATENT OFFICE
CERTIFICATE OF CORRECTION

PATENT NO. : 4,011,986
DATED : March 15, 1977
INVENTOR(S) : Richard C. O'Brien, deceased It is certified that error appears in the above-identified patent and that said Letters Patent are hereby corrected as shown below:

Column 2, line 51 "tthe" should be --the--.

Column 3, line 50 "card" should be --cards--.

Column 4, line 40 "operation" should be --operating--.

Column 6, line 7 "slide" should be --slides--.

Column 7, line 37 "ratating" should be --rotating--; line 52 "sot" should be --slot--.

Column 8, line 17 after "side" insert --edges--; line 44 after "the", second occurrence, insert --card to--.

Column 9, line 51 "in" should be --into--.

Column 10, lines 60 and 61 delete "an actuator bar interconnected with said with said reset bar,".

Signed and Sealed this

Thirty-first Day of May 1977

[SEAL]

Attest:

RUTH C. MASON
Attesting Officer

C. MARSHALL DANN
Commissioner of Patents and Trademarks